US011041707B2

(12) United States Patent
Omori

(10) Patent No.: US 11,041,707 B2
(45) Date of Patent: Jun. 22, 2021

(54) ROUNDNESS MEASURING DEVICE

(71) Applicant: MITUTOYO CORPORATION, Kanagawa (JP)

(72) Inventor: Yoshiyuki Omori, Higashihiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 219 days.

(21) Appl. No.: 16/179,227

(22) Filed: Nov. 2, 2018

(65) Prior Publication Data

US 2019/0145753 A1 May 16, 2019

(30) Foreign Application Priority Data

Nov. 13, 2017 (JP) .............................. JP2017-217998

(51) Int. Cl.
*G01B 7/28* (2006.01)
*G01B 3/34* (2006.01)
*G01B 3/18* (2006.01)

(52) U.S. Cl.
CPC ............. *G01B 7/282* (2013.01); *G01B 3/18* (2013.01); *G01B 3/34* (2013.01)

(58) Field of Classification Search
CPC ........ G01B 5/008; G01B 21/20; G01B 5/201; G01B 5/204; G01B 7/282; G01B 5/20; G01B 21/042; G01B 5/28; G01B 11/005
USPC .................................................. 33/813, 552
See application file for complete search history.

(56) References Cited

U.S. PATENT DOCUMENTS

| 3,808,696 | A | * | 5/1974 | Possati ..................... G01B 7/13 33/544.5 |
| 5,014,440 | A | * | 5/1991 | Lessi ........................ G01B 7/16 33/557 |
| 5,711,083 | A | * | 1/1998 | Bidwell .................... G01B 5/08 33/543 |
| 6,941,199 | B1 | * | 9/2005 | Bottomley ........... G05D 1/0227 701/23 |
| 9,803,968 | B2 | | 10/2017 | Nakayama |
| 10,323,921 | B2 | * | 6/2019 | Nakayama ........... G01B 5/0009 |
| 2016/0265912 | A1 | | 9/2016 | Yasuno |
| 2018/0058836 | A1 | * | 3/2018 | Nakayama ............. G01B 5/201 |
| 2018/0073852 | A1 | | 3/2018 | Nakayama et al. |
| 2019/0145753 | A1 | * | 5/2019 | Omori ...................... G01B 3/18 33/813 |
| 2019/0155385 | A1 | * | 5/2019 | Lim ..................... H04L 63/0861 |

FOREIGN PATENT DOCUMENTS

| JP | S57-037406 U1 | 1/1982 |
| JP | S58-189909 U1 | 12/1983 |
| JP | S62-191709 A | 8/1987 |
| JP | 2016-151292 A | 8/2016 |
| JP | 2016-166766 A | 9/2016 |

* cited by examiner

*Primary Examiner* — Yaritza Guadalupe-McCall
(74) *Attorney, Agent, or Firm* — Greenblum & Bernstein, P.L.C.

(57) ABSTRACT

A roundness measuring device includes an annular ring, and a plurality of displacement sensors (comparative length measuring devices) provided on the ring at predetermined intervals. The displacement sensors are arranged such that lines along which measurement axes of the displacement sensors extend intersect at a single point.

14 Claims, 10 Drawing Sheets

ROUNDNESS MEASURING DEVICE

CROSS-REFERENCE TO RELATED APPLICATIONS

The present application claims priority under 35 U.S.C. § 119 of Japanese Application No. 2017-217998, filed on Nov. 13, 2017, the disclosure of which is expressly incorporated by reference herein in its entirety.

BACKGROUND OF THE INVENTION

1. Field of the Invention

The present invention relates to a simple roundness measuring device that can be used with convenience, such as a compact measuring device.

2. Description of Related Art

A roundness measuring device is an example of a measuring device that measures the roundness of a circular column, a cylindrical tube, and the like (Japanese Patent Laid-open Publication Nos. 2016-166766 and 2016-151292). The roundness measuring device is provided with a rotary table and a coordinate measurer. The rotary table is provided with a placement stage on which a measured object (measurable object) is placed, and a rotary driver that rotates the placement stage. The coordinate measurer is provided with a probe that detects a surface of the measured object and a displacement mechanism that displaces the probe two- or three-dimensionally. In addition, the displacement mechanism is provided with a plurality of encoders that detect an amount or angle of displacement.

Of course, a roundness measuring device is necessary for making fine measurements of the roundness of a measured object, but such devices inevitably become large in scale and locations where the devices can be installed are limited. Accordingly, in order to use a roundness measuring device, the measured object must be taken to a place where a roundness measuring device is located. In addition, using a roundness measuring device requires quite cumbersome advance preparations. For example, using a rotary table requires adjusting air bearings or adjusting an inclination and/or position of a placement stage (centering). Moreover, the rotary table rotates during measurement, and therefore there is no alternative but to wait for the rotary table to complete at least one rotation. There may also be a desire to occasionally check roundness in a simple way while processing a work piece W, but using a roundness measuring device for each desired check incurs a significant loss of time and effort.

SUMMARY OF THE INVENTION

The present invention provides a simple roundness measuring device that can be used with convenience, such as a compact measuring device.

A roundness measuring device according to the present invention includes an annular ring portion, and a plurality of displacement sensors provided to the ring portion at predetermined intervals. The displacement sensors are arranged such that lines along which measurement axes of the displacement sensors extend intersect at a single point.

In the present invention, preferably, there are at least eight of the displacement sensors.

In the present invention, preferably, the displacement sensor includes a spindle having a stylus head at a distal end, the spindle being provided so as to be capable of advancing and retreating in an axis direction. The displacement sensor is preferably configured so as to detect displacement of the spindle and output the displacement as measurement data. The displacement sensor is preferably arranged such that a projection direction of the spindle is oriented toward an interior of the ring portion.

A cylindricity measuring device according to the present invention is configured by arranging a plurality of the roundness measuring devices to be stacked on top of each other in a vertical direction.

A roundness measuring method according to the present invention is a roundness measuring method using the roundness measuring device above, and includes: calibration, in which the displacement sensors are set to zero with a master that is a perfect circle and serves as a reference; measurement, in which a measured object is measured by the displacement sensors; eccentricity calculation, in which offset between a position of the master during calibration and a position of the measured object during measurement is calculated as eccentricity; and roundness calculation, in which the eccentricity obtained in the eccentricity calculation is subtracted from measured values of the displacement sensors obtained in the measurement, and offset of the measured object from a perfect circle is calculated.

In the present invention, preferably, in the eccentricity calculation, when the eccentricity is split into an X axis component and a Y axis component and expressed by ($\Delta Cx$, $\Delta Cy$), the eccentricity ($\Delta Cx$, $\Delta Cy$) is found by $$\Delta Cx = 2 \times (\Sigma_{i=1}^{i=n}\{di \cdot \cos \theta i\})/n$$

$$\Delta Cy = 2 \times (\Sigma_{i=1}^{i=n}\{di \cdot \sin \theta i\})/n$$

Here, di is a measured value for each of the displacement sensors. Also, the X axis is treated as a reference line, and an angle formed by the X axis and the measurement axis of each displacement sensor is represented by $\theta i$.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
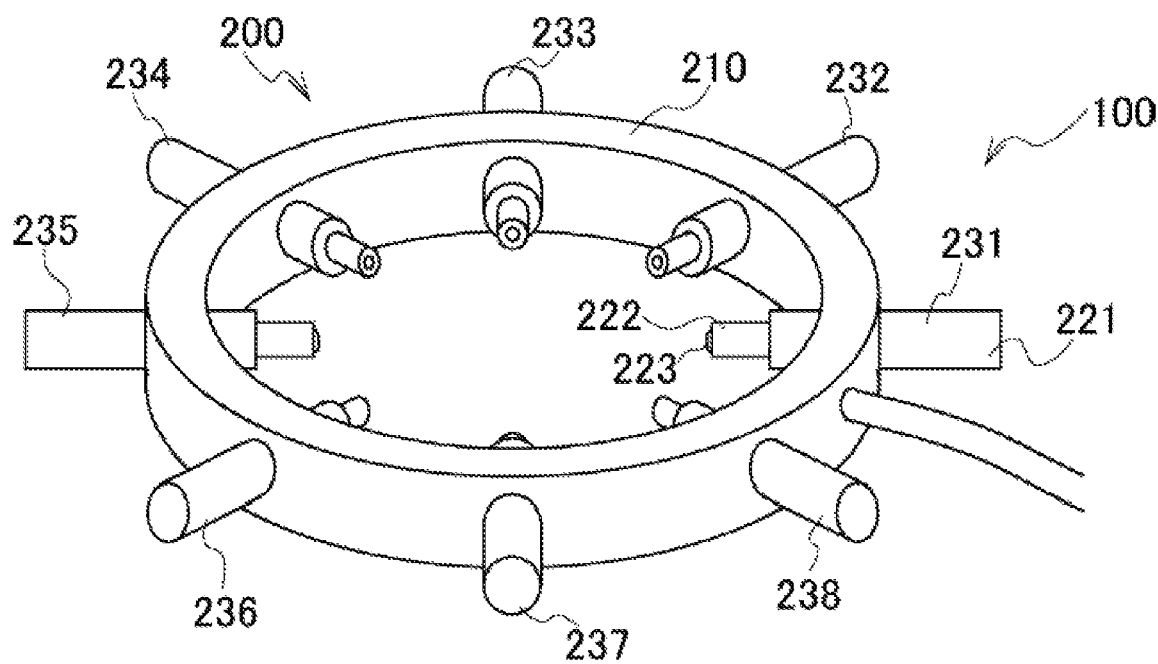
FIG. 1 is an external view of a roundness measuring device.
Figure 1:
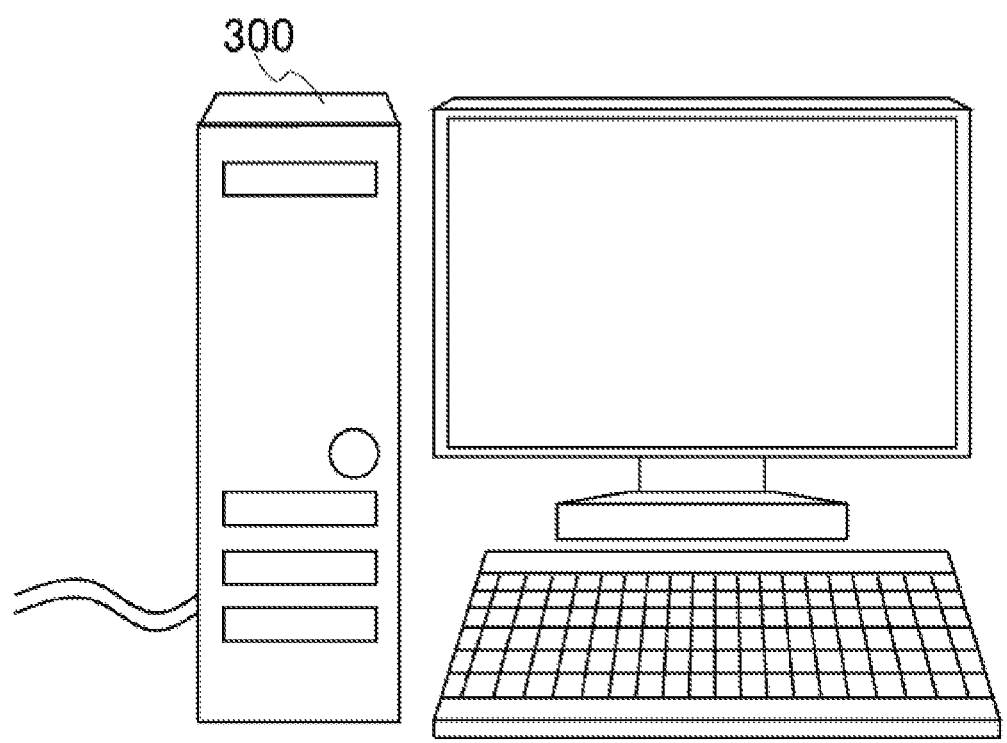

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

An embodiment of the present invention is illustrated in the drawings and is described with reference to the reference signs assigned to each component in the drawings.

First Embodiment

FIG. 1 is an external view of a roundness measuring device (roundness measuring sensor) 100. This example illustrates the roundness measuring device 100, which measures the roundness of an external diameter of a measured object (measurable object). The roundness measuring device 100 includes a measurer 200 and a calculator 300.

The measurer 200 includes an annular ring portion 210 and electric micrometers (displacement sensors) 231 to 238, which are provided on the ring portion 210 at predetermined angular intervals.

The ring portion (ring) 210 is a ring having a diameter that is a size larger than the measured object. The ring portion 210 can be substantially circular and does not need to be a minutely perfect circle. In addition, the ring portion 210 may have an angular shape rather than being circular, and could for example be octagonal. Also, a slit may be formed in a portion of the ring portion 210, and the ring portion 210 may be capable of opening and closing or of separating.

The electric micrometers 231 to 238 each include a spindle 222 which advances and retreats in an axis direction through an interior of a tubular stem 221. A stylus head 223 is provided to a distal end of the spindle 222. The electric micrometers 231 to 238 detect the displacement of the spindles 222 advancing and retreating in the axis direction through the interior of the stems 221 and output the displacement as measurement data.

Figure 2:
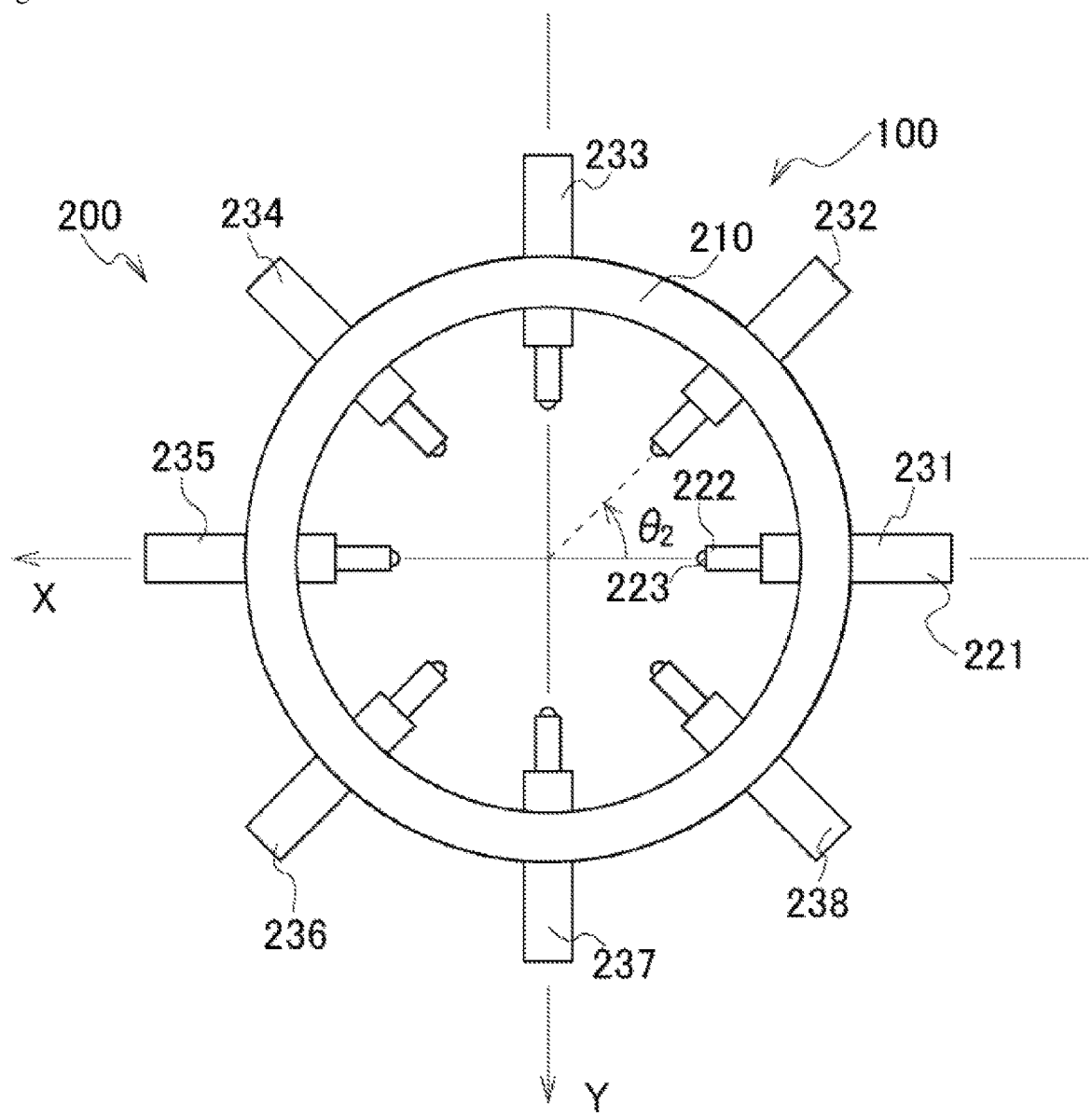
FIG. 2 is a view from directly above a measurer.

FIG. 2 is a view from directly above the measurer 200. Eight electric micrometers 231 to 238 are arranged at 45° intervals on the ring portion 210. Here, in FIG. 2, eight electric micrometers are designated as a first electric micrometer 231 through an eighth electric micrometer 238. A projection direction of the spindle 222 of each of the electric micrometers 231 to 238 is oriented toward the interior of the ring portion 210. More specifically, the projection directions of all of the spindles 222 are oriented at the center of the ring portion 210, and if a measurement axis (displacement direction of the spindle 222) of each of the electric micrometers 231 to 238 were extended, the axes would intersect at the center. In cases where the ring portion 210 is not a perfect circle, or where the ring portion 210 has an angular shape, the center of the ring portion 210 must be defined. However, the center of an inscribed circle or circumscribed circle of the ring portion 210 can be thought of as the center of the ring portion 210. More fundamentally, the electric micrometers 231 to 238 should be arranged such that the measurement axis lines (line along which the measurement axis extends) of all of the electric micrometers (in this example, eight) 231 to 238 intersect at a single point. The point where all of the measurement axis lines intersect is designated as the center of the ring portion 210.

An X axis runs from right to left in FIG. 2. The X axis passes through the center, links the measurement axis of the first electric micrometer 231 and the measurement axis of the fifth electric micrometer 235, and is equivalent to the extended lines thereof. A Y axis runs from top to bottom in FIG. 2. The Y axis passes through the center, links the measurement axis of the third electric micrometer 233 and the measurement axis of the seventh electric micrometer 237, and is equivalent to the extended lines thereof. Also, the X axis is treated as a reference line, and an angle formed by the X axis and the measurement axis of each electric micrometer is represented by θ1 to θ8, respectively. Only θ2 is illustrated in FIG. 2 for exemplary purposes. θ1 to θ8 are referred to as the "angles of the electric micrometers." Design values for the angles of the electric micrometers are as follows:

θ1=0°
θ2=45°
θ3=90°
θ4=135°
θ5=180°
θ6=225°
θ7=270°
θ8=315°

In the design, the electric micrometers 231 to 238 are arranged at 45° intervals, but an actual product may not necessarily achieve accurate 45° intervals. In a case where the angles θ1 to θ8 of the electric micrometers 231 to 238 of the actual product differ from the design values, preferably the angle is actually measured in order to accurately find θ1 to θ8.

The measured value from each of the electric micrometers 231 to 238 is wired or wirelessly transmitted to the calculator 300, and computation is performed by the calculator 300. The calculator 300 is, for example, a personal computer (specifically, a CPU and memory), and calculates the roundness of the measured object by executing a roundness calculation program. (So long as a device is capable of executing the roundness calculation program, a smart phone or tablet may of course be substituted for the personal computer.) Next, a method of using a roundness measuring device is described, including a specific processing protocol performed by the calculator 300 (roundness calculation program).

Measurement Procedure

Figure 3:
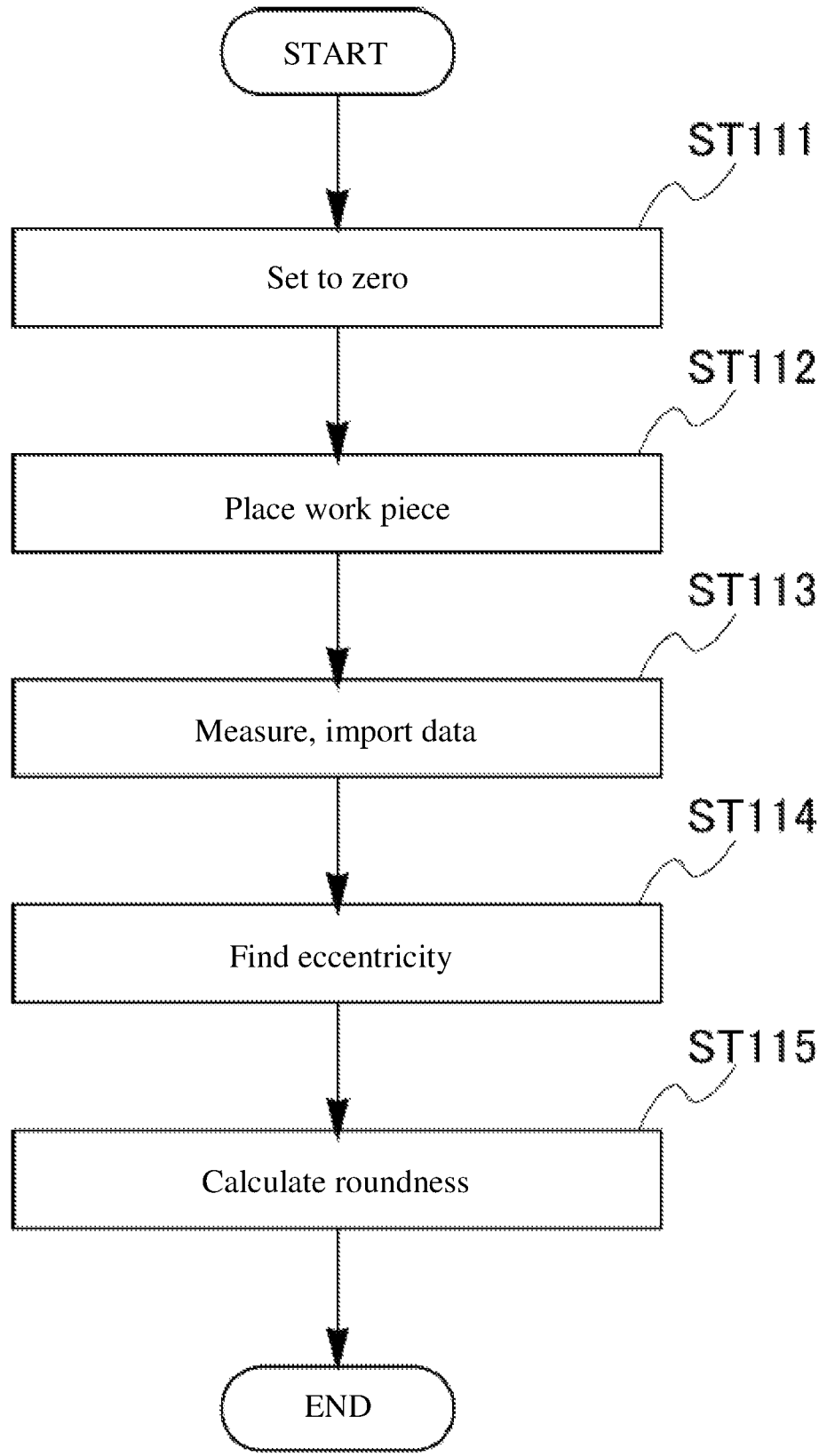
FIG. 3 is a flow chart describing a measurement procedure of the roundness measuring device.

FIG. 3 is a flow chart describing a measurement procedure of the roundness measuring device 100. First, in ST111, zero-setting is performed. A master MW (see FIG. 4) that is a perfect circle and serves as reference is prepared ahead of time. The master MW should be a perfect circle, and may have a different diameter and size from the measured object (work piece W). Then, the master MW is measured with the measurer 200. The master MW may be picked up and placed inside the ring portion 210, or the measurer 200 may be picked up and lowered around the master MW from above.

Figure 4:
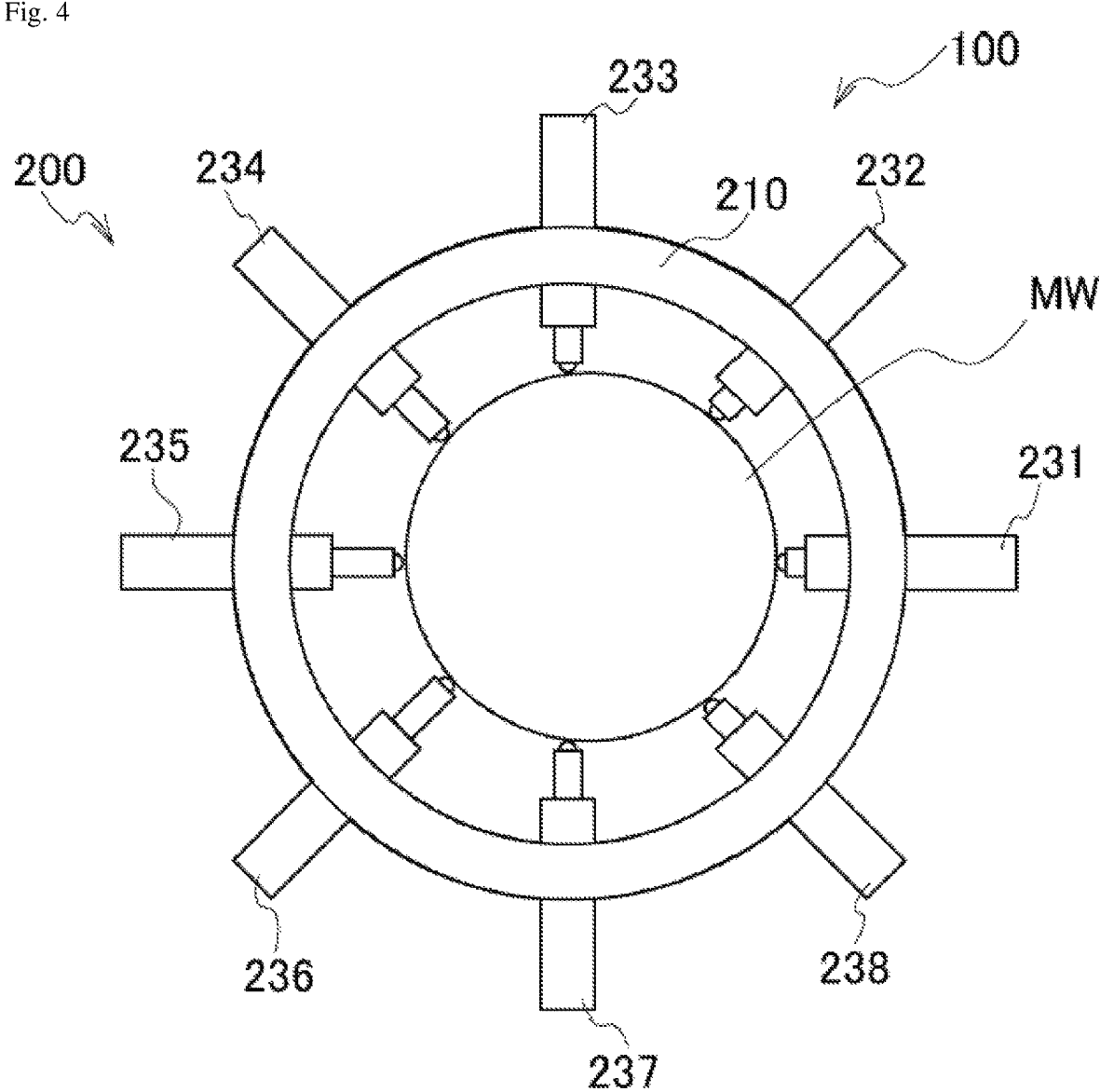
FIG. 4 illustrates an example of zero-setting with a master MW.

At this point, the master MW is preferably at the exact center of the ring portion 210, but there is no issue even if the master MW is offset from the exact center. In other words, the position of the master MW at the time of zero-setting may be any position. FIG. 4 illustrates an example of zero-setting with the master MW, and the master MW is intentionally depicted as slightly offset from the exact center (offset somewhat to the right and up). Then, the stylus head 223 of each of the electric micrometers 231 to 238 is confirmed as being in contact with a side surface of the master MW and, in this state, the measured value of each of the electric micrometers 231 to 238 is set to zero.

The measured value for each of the electric micrometers 231 to 238 is expressed by Di, where i is an integer from 1 to 8. Specifically, the measured value of the first electric micrometer 231 is expressed by D1, the measured value of the second electric micrometer 232 is expressed by D2, and so on. When set to zero, the values are as follows:

D1=0.00
D2=0.00
D3=0.00
D4=0.00
D5=0.00
D6=0.00
D7=0.00
D8=0.00

This zero-set calibration is preferably performed each time, but there is no need to perform zero-set calibration each time so long as the values are stored in the memory.

Figure 5:
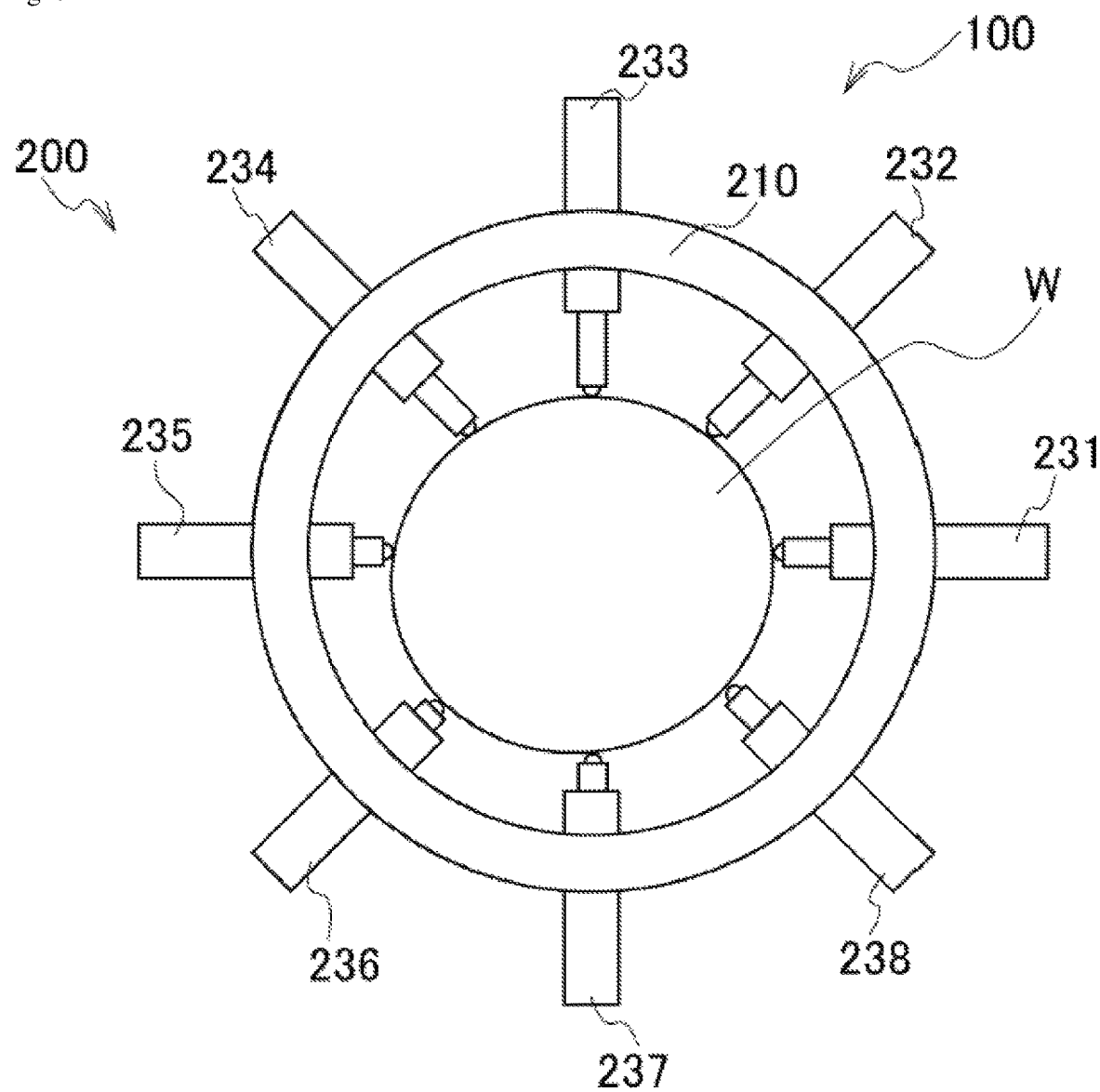
FIG. 5 illustrates an example of measuring a work piece W.

Next, the master MW is removed and the measured object (work piece) W is set in the measurer 200 (ST112). FIG. 5 illustrates an example of measuring the work piece W. At this point, the work piece W is also preferably at the exact center of the ring portion 210, but there is no issue even if the work piece W is offset from the exact center as in FIG. 5. In other words, the position of the work piece W at the time of measurement may be any position.

Then, the stylus head 223 of each of the electric micrometers 231 to 238 is confirmed as being in contact with a side surface of the work piece W and a measured value of each of the electric micrometers 231 to 238 is acquired (ST113). The measured values of the first electric micrometer 231 through the eighth electric micrometer 238 are designated as d1 to d8.

D1=d1
D2=d2
D3=d3
D4=d4
D5=d5
D6=d6
D7=d7
D8=d8

The measured values d1 to d8 are imported into the calculator 300.

Figure 6:
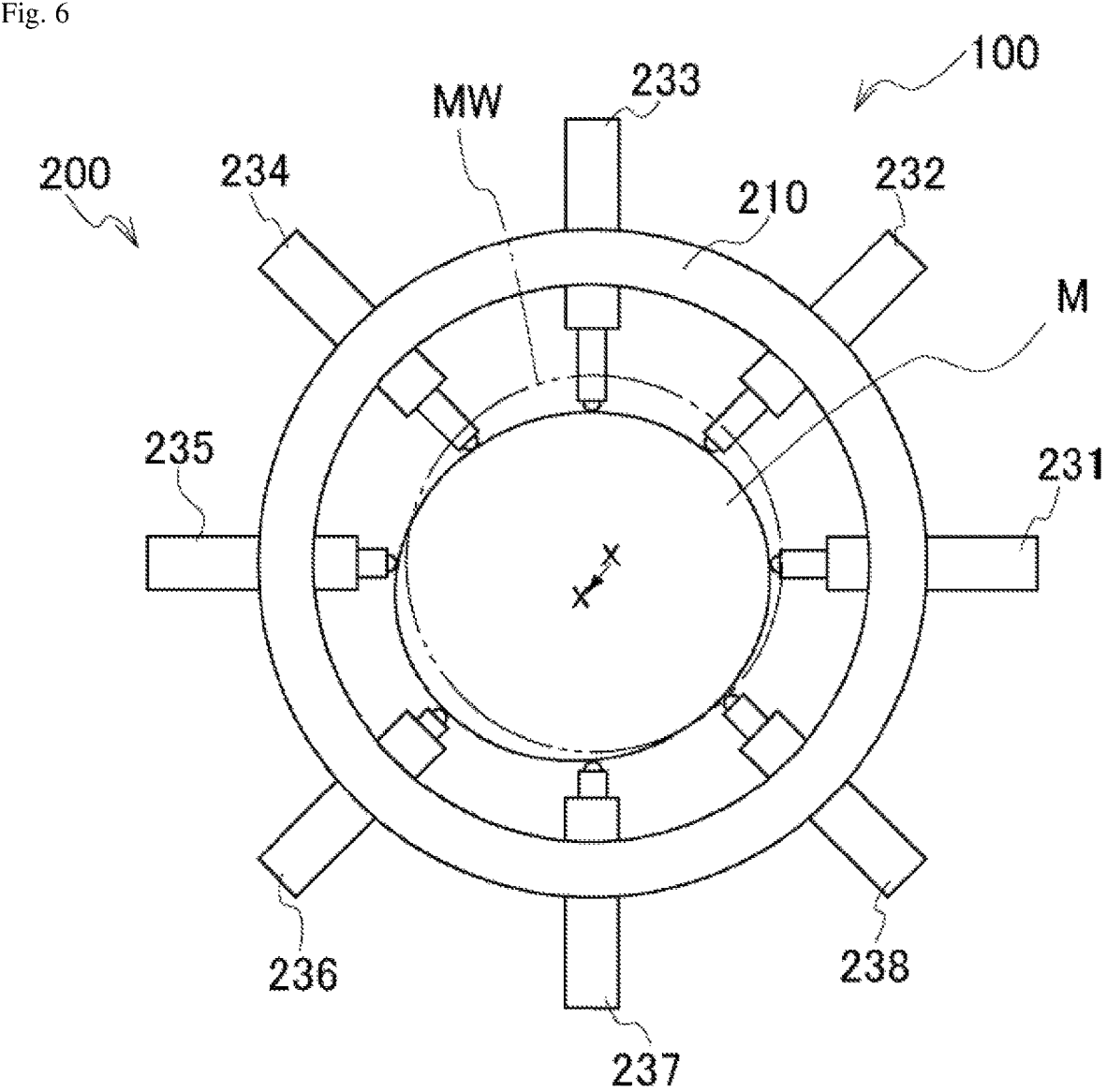
FIG. 6 is a diagram schematically describing eccentricity.
Figure 6:
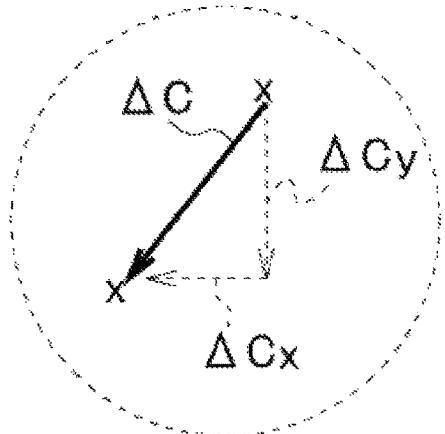

Next, the "eccentricity" between the master MW and the work piece W at the time of measurement is found (ST114). As illustrated in FIGS. 4 and 5, the position of the master MW during zero-setting (ST111) is not the same as the position of the work piece W during measurement (ST113). In view of this, first, the offset between the position of the master MW and the position of the work piece W is found. The offset between the position of the master MW and the position of the work piece W is treated as the "eccentricity," and is found with the following formula. An eccentricity $\Delta C$ is split into an X axis component and a Y axis component, and is expressed by ($\Delta Cx$, $\Delta Cy$) (see FIG. 6). At this point, the eccentricity $\Delta C$ ($\Delta Cx$, $\Delta Cy$) is found as follows.

$$\Delta Cx = 2 \times (\Sigma_{i=1}^{i=8} \{di \cdot \cos \theta i\})/8$$

$$\Delta Cy = 2 \times (\Sigma_{i=1}^{i=8} \{di \cdot \sin \theta i\})/8$$

Then, when the eccentricity is subtracted from the measured value di of each of the electric micrometers 231 to 238, a difference in shape between the work piece W and the master MW is extracted. Specifically, the roundness of the work piece W is found (ST115). Here, the difference in shape between the work piece W and the master MW at the position of the first electric micrometer 231 is expressed as $\Delta R1$. Likewise, the difference in shape between the work piece W and the master MW at the position of the ith electric micrometer 231 to 238 is expressed as $\Delta Ri$, where i is 1 to 8.

$$\Delta R1 = d1 - (\Delta Cx \cdot \cos \theta 1 + \Delta Cy \cdot \sin \theta 1)$$

$$\Delta R2 = d2 - (\Delta Cx \cdot \cos \theta 2 + \Delta Cy \cdot \sin \theta 2)$$

$$\Delta R3 = d3 - (\Delta Cx \cdot \cos \theta 3 + \Delta Cy \cdot \sin \theta 3)$$

$$\Delta R4 = d4 - (\Delta Cx \cdot \cos \theta 4 + \Delta Cy \cdot \sin \theta 4)$$

$$\Delta R5 = d5 - (\Delta Cx \cdot \cos \theta 5 + \Delta Cy \cdot \sin \theta 5)$$

$$\Delta R6 = d6 - (\Delta Cx \cdot \cos \theta 6 + \Delta Cy \cdot \sin \theta 6)$$

$$\Delta R7 = d7 - (\Delta Cx \cdot \cos \theta 7 + \Delta Cy \cdot \sin \theta 7)$$

$$\Delta R8 = d8 - (\Delta Cx \cdot \cos \theta 8 + \Delta Cy \cdot \sin \theta 8)$$

From among $\Delta R1$ to $\Delta R8$ which are found in this way, the maximum value is designated Rmax and the minimum value is designated Rmin.

$$R\max = \text{MAX}\{\Delta R1, \Delta R2, \Delta R3, \Delta R4, \Delta R5, \Delta R6, \Delta R7, \Delta R8\}$$

$$R\min = \text{MIN}\{\Delta R1, \Delta R2, \Delta R3, \Delta R4, \Delta R5, \Delta R6, \Delta R7, \Delta R8\}$$

Then, the roundness is found as the difference between Rmax and Rmin.

$$\text{Roundness} = R\max - R\min$$

There are also other ways to define the roundness. Even in such cases, the geometric variance of the work piece W relative to a perfect circle is found using $\Delta R1$ to $\Delta R8$, and therefore any appropriate calculation can be performed in accordance with the definition of roundness.

SUPPLEMENTAL DESCRIPTION

In the foregoing description, the position of the master MW during zero-setting is arbitrary, as is the position of the work piece W during work piece measurement. This lack of any need whatsoever for an alignment task ties into the convenience of the roundness measuring device 100 according to the present embodiment. The theoretical point that enables such a simple roundness measurement lies in the fact that a deviation of the work piece W from a perfect circle can be extracted by finding the eccentricity $\Delta C$ ($\Delta Cx$, $\Delta Cy$) between the master MW at the time of zero-setting and the work piece W at the time of measurement, and subtracting the eccentricity $\Delta C$ ($\Delta Cx$, $\Delta Cy$) from the measured value di. A supplemental description of this point is given hereafter.

Figure 7A:
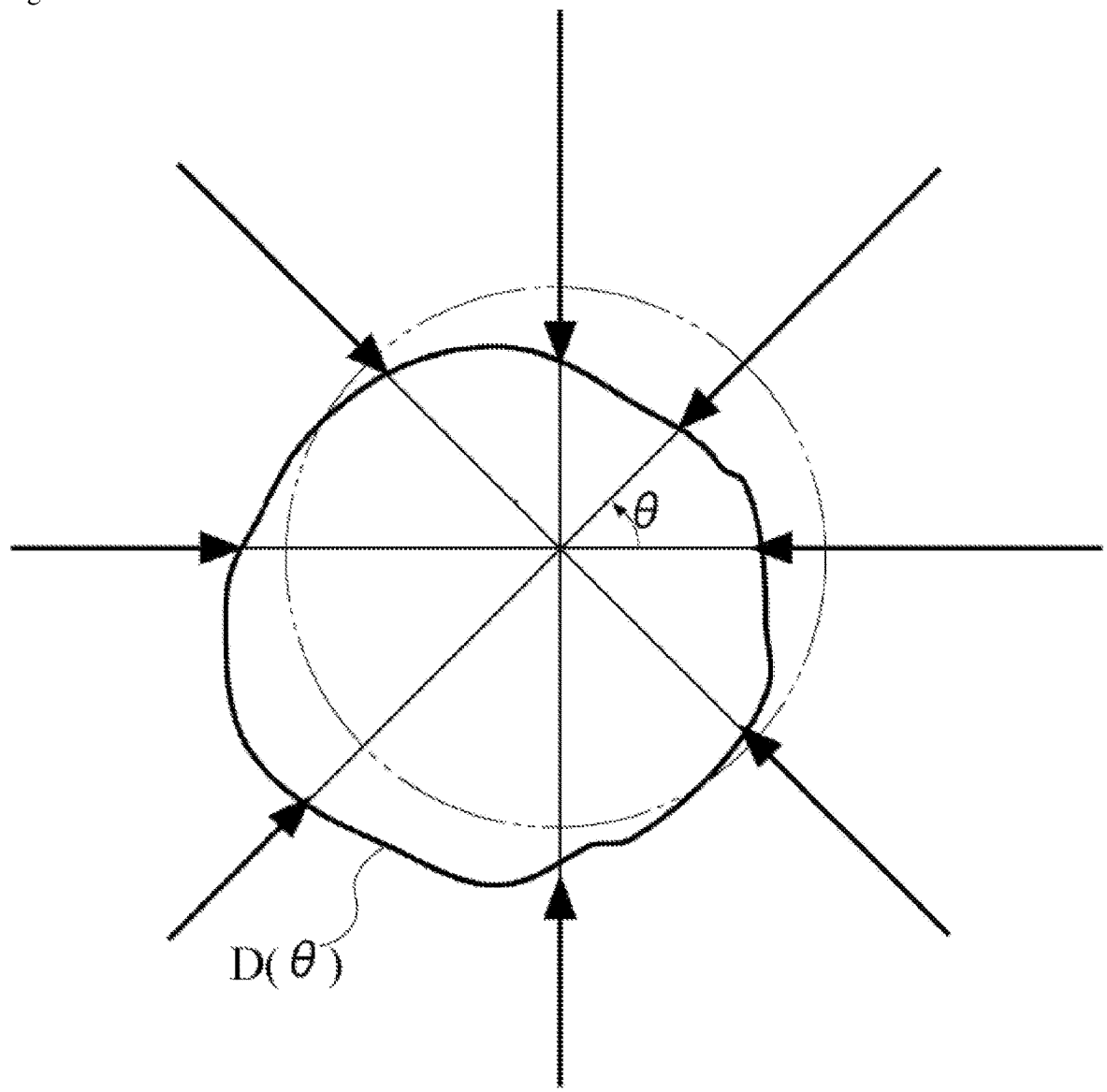
FIGS. 7A and 7B are diagrams describing a method of finding the eccentricity.
Figure 7B:
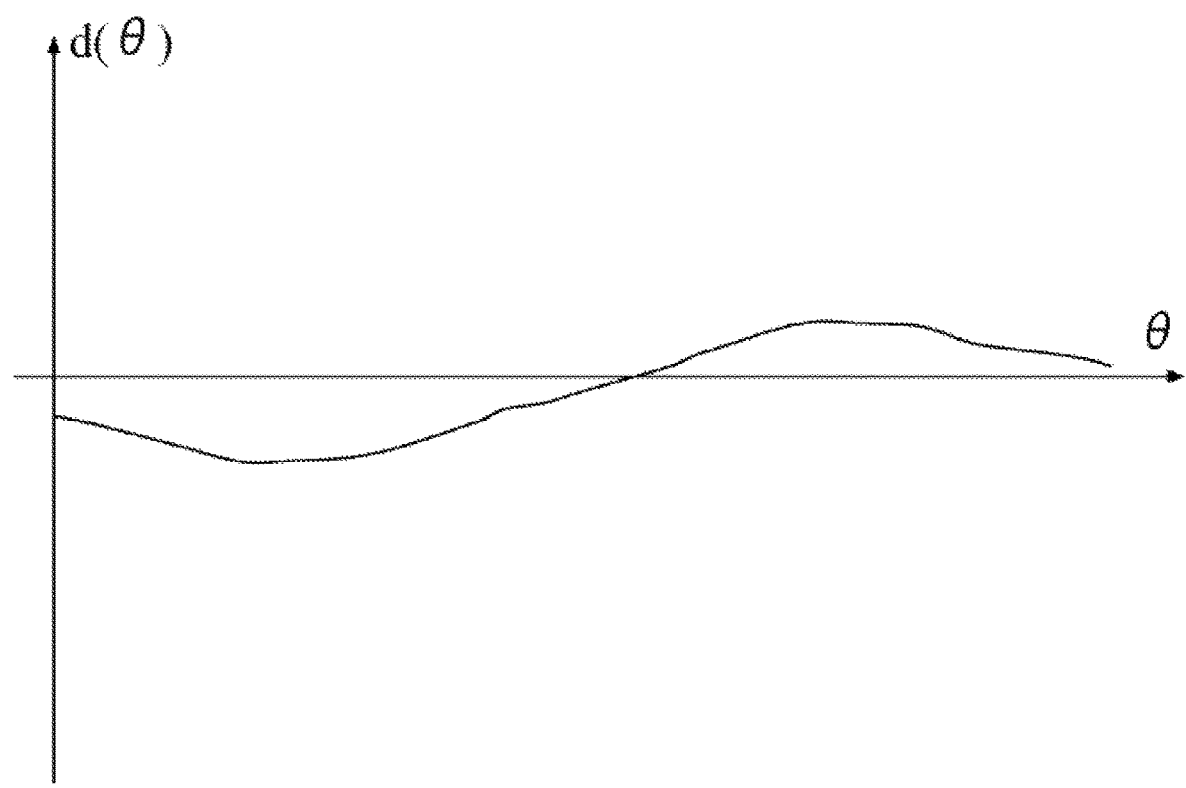

In FIG. 7A, a profile shape of the work piece W is expressed by $D(\theta)$. When FIG. 7A is sectioned at $\theta = 0$ and extended, FIG. 7B is the result. In this example, $D(\theta)$ can be expressed as follows with a Fourier series.

$$D(\theta) = a0 + a1 \cdot \cos\theta + a2 \cdot \cos 2\theta + a3 \cdot \cos 3\theta + \ldots + b1 \cdot \sin\theta + b2 \cdot \sin 2\theta + b3 \cdot \sin 3\theta + \ldots = a0 + \left(\sum_{k=1}^{k=\infty} \{ak \cdot \cos(k\theta)\}\right) + \left(\sum_{k=1}^{k=\infty} \{bk \cdot \sin(k\theta)\}\right)$$

In this example, the coefficient k=1 expresses the eccentricity. After each sensor is set to zero with the master MW, when the work piece W is measured, the measured value of each sensor is acquired as d1 to d8. In view of this, using discrete sampling data (d1 to d8) in the Fourier series for D(θ) can be considered a discrete Fourier transform. Applying this yields the eccentricity as follows.

$$a1 = \Delta Cx = f(D(\theta) \cdot \cos \theta) d\theta$$

And when discretized:

$$a1 = \Delta Cx = 2 \times (\Sigma_{i=1}^{i=8} \{di \cdot \cos \theta i\})/8$$

Similarly, $$b1 = \Delta Cy = f(D(\theta) \cdot \sin \theta) d0$$

And when discretized:

$$b1 = \Delta Cy = 2 \times (\Sigma_{i=1}^{i=8} \{di \cdot \sin \theta i\})/8$$

In this connection, $a0 = 2 \times (\Sigma_{i=1}^{i=8}\{di\})/8$, which expresses the difference in size between the master and the work piece.

Then, when the eccentricity is subtracted from the measured value di of each of the electric micrometers 231 to 238, the difference in shape between the work piece W and the master MW is extracted. Specifically, the roundness of the work piece W is found (ST115).

A shape measuring device with measuring devices arranged in a ring shape is described in Japanese Patent Laid-open Publication No. S62-191709 and Japanese Examined Utility Model Publication Nos. S57-037406 and S58-189909, and superficially these devices appear structurally similar to the present embodiment. However, none of these documents provide any disclosure whatever of zero-setting, the method of acquiring the eccentricity, calculating the shape of the work piece by subtracting the eccentricity, or the roundness calculation based on these principles according to the present embodiment.

First Modification

In the embodiment described above, an example is described of the roundness measuring device 100 having eight electric micrometers (displacement sensors) arranged in a circle at 45° intervals. With eight electric micrometers (displacement sensors) at 45° intervals, in theory an elliptical component of the work piece W can be found, which should be sufficient for a simple evaluation of roundness. However, the number of displacement sensors can, of course, be further increased.

Second Modification

In the embodiment described above, an example is given of the roundness measuring device 100 in which the roundness of the external diameter of the work piece W is measured. However, reversing the projection direction of the spindles 222 of the electric micrometers yields a roundness measuring device that measures the roundness of an internal diameter of a cylindrical tube. (An embodiment according to the second modification is referred to as an internal roundness measuring device. An embodiment of the roundness measuring device according to the first embodiment is referred to as an external roundness measuring device.) If the electric micrometers are configured so as to enable measurement in an inward direction of the ring portion as well as an outward direction, the roundness of both the external diameter and the internal diameter could be measured. This could be adopted by providing two spindles for each electric micrometer with one for inward projection and one for outward projection.

Third Modification

Figure 8:
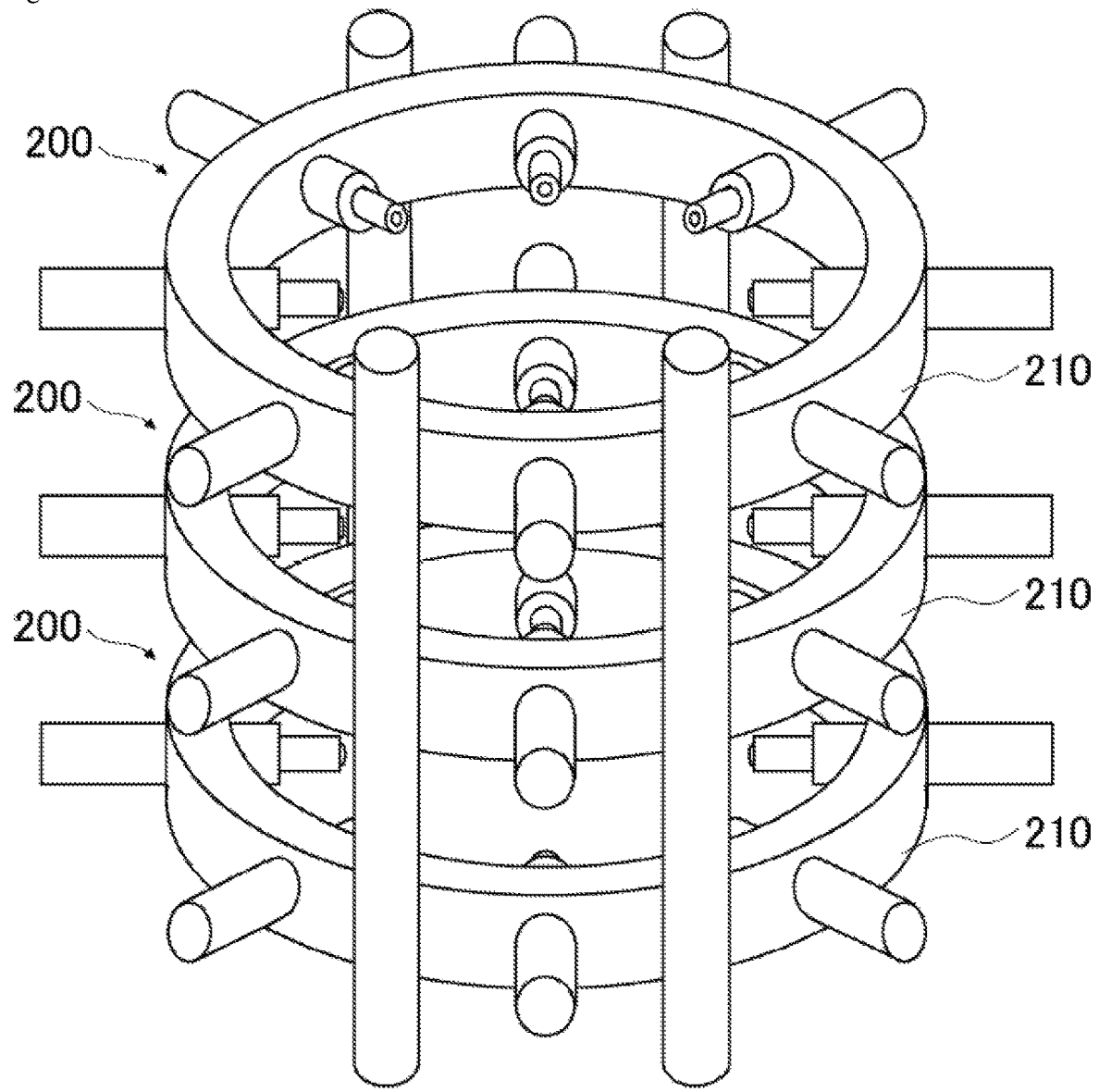
FIG. 8 illustrates an exemplary measuring device that measures cylindricity (degree of coaxiality), as a modification.

Furthermore, as illustrated in FIG. 8, when measurers 200 are linked in a vertical direction, they can be used as a measuring device (cylindricity measuring device) measuring cylindricity (degree of coaxiality). In the example of FIG. 8, the electric micrometers are configured to strike a cylindrical work piece from the exterior. Each roundness measuring device measures an exterior circle of the cylinder at a plurality of positions (three locations in FIG. 8) along a center line of the cylindrical work piece, and a degree to which the exterior circle deviates can be readily understood. An embodiment according to FIG. 8 is referred to as an external cylindricity measuring device.

A plurality of internal roundness measuring devices in which the projection direction of the spindles 222 of the electric micrometers has been reversed, as in the second modification, can also be stacked on top of each other. In such a case, the degree to which an interior circle deviates can be readily understood. An embodiment according to this example is referred to as an internal cylindricity measuring device.

Of course, a configuration is also possible in which an internal cylindricity measuring device is arranged inside the ring of an external cylindricity measuring device. This makes possible a simple cylindricity measuring device that measures the cylindricity (degree of coaxiality) of the cylindrical work piece by simultaneously measuring both the interior and exterior of the cylindrical work piece.

Fourth Modification

Figure 9:
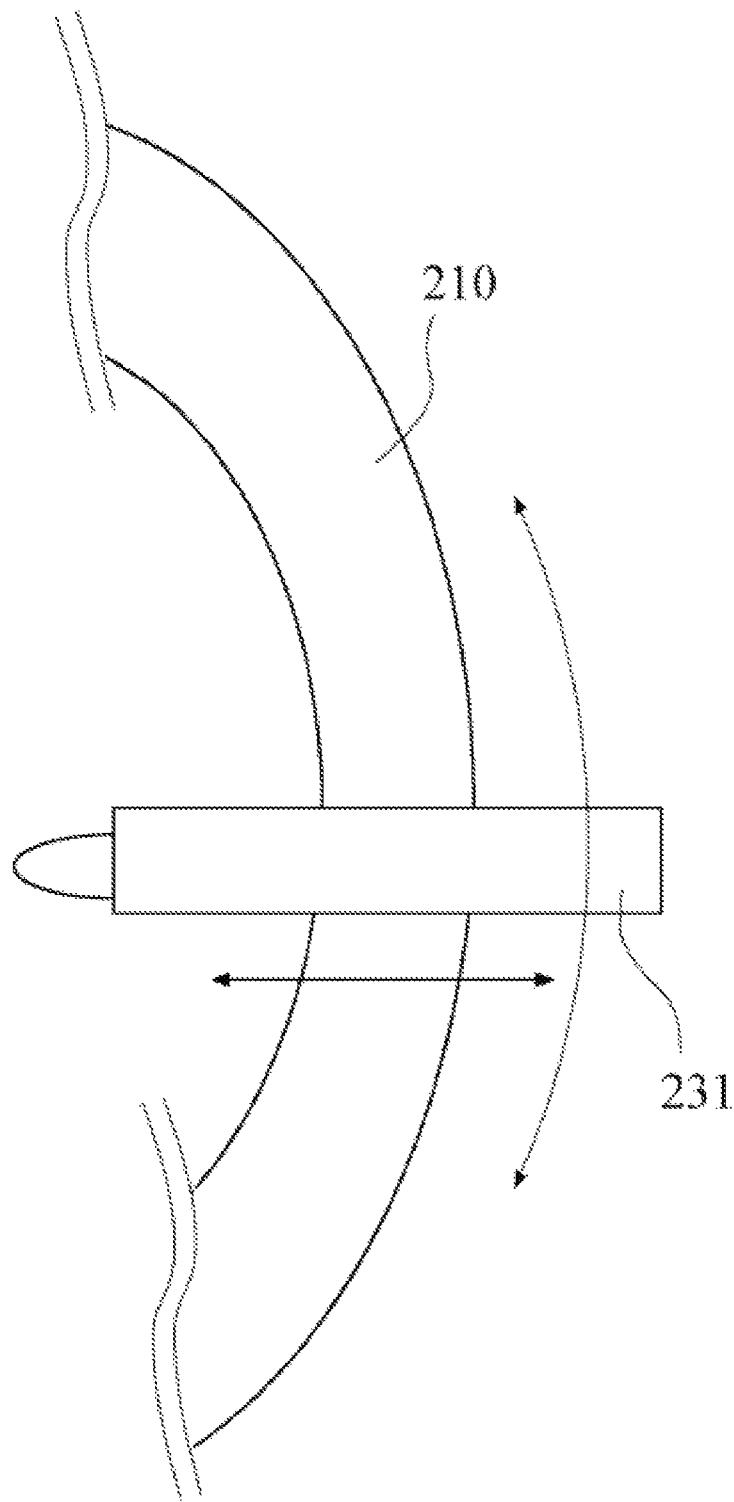
FIG. 9 is an explanatory diagram of a modification.

As illustrated in FIG. 9, the electric micrometers should be provided so as to be capable of displacement in a measurement axis direction or in a circumferential direction of the ring portion. The stroke of the spindle of the electric micrometer is not particularly large, and therefore the electric micrometer should be capable of displacement in the measurement axis direction so as to be capable of accommodating work pieces of various sizes. Also, the electric micrometers should be provided so as to be capable of displacement in the circumferential direction of the ring portion so as to allow fine adjustment of the angle (θ1 to θ8) of the electric micrometer. In order to make the electric micrometers capable of fine displacement, a stop screw or the like can be used.

In addition, the roundness measuring device is preferably used in a horizontal state. Therefore, a level (a simple spirit level is sufficient) can be added. For example, X direction and Y direction levels can both be provided to the ring portion.

Moreover, the present invention is not limited to the embodiment described above, and may be modified as needed without departing from the scope of the present invention. In the embodiment described above, an electric micrometer having a linear drive spindle is given as an example of a displacement sensor. However, the electric micrometer can be replaced by a lever-type test indicator, or can also be replaced by a laser range finder (non-contact sensor). The first embodiment and first to fourth modifications described above can, of course, be combined as appropriate.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A roundness measuring device comprising:
   a circular band; and
   a plurality of displacement sensors provided on the band at predetermined intervals,
   wherein the plurality of displacement sensors is arranged such that a respective line along which a measurement axis of each displacement sensor of the plurality of displacement sensors extends, intersects at a single point.

2. The roundness measuring device according to claim 1, wherein the plurality of displacement sensors comprise at least eight displacement sensors.

3. The roundness measuring device according to claim 2, wherein:
   each displacement sensor of the plurality of displacement sensors includes a spindle having a stylus head at a distal end thereof, the spindle being capable of advancing and retreating in an axis direction,
   each displacement sensor of the plurality of displacement sensors is configured so as to detect displacement of the spindle and output the displacement as measurement data, and
   each displacement sensor of the plurality of displacement sensors is arranged such that a projection direction of each said respective spindle is oriented toward an interior of the band.

4. The roundness measuring device according to claim 1, wherein:
   each displacement sensor of the plurality of displacement sensors includes a spindle having a stylus head at a distal end thereof, the spindle being capable of advancing and retreating in an axis direction,
   each displacement sensor of the plurality of displacement sensors is configured so as to detect displacement of the spindle and output the displacement as measurement data, and
   each displacement sensor of the plurality of displacement sensors is arranged such that a projection direction of each said respective spindle is oriented toward an interior of the band.

5. A cylindricity measuring device comprising:
   a plurality of the roundness measuring sensors stacked on top of each other in a vertical direction, each roundness measuring sensor of the plurality of the roundness measuring sensors comprising:
   a circular band; and
   a plurality of displacement sensors provided on the band at predetermined intervals,
   wherein the plurality of displacement sensors is arranged such that a respective line along which a measurement axis of each displacement sensor of the plurality of displacement sensors extends, intersects at a single point.

6. The cylindricity measuring device according to claim 5, wherein the plurality of displacement sensors comprise at least eight displacement sensors.

7. The cylindricity measuring device according to claim 6, wherein:
   each displacement sensor of the plurality of displacement sensors includes a spindle having a stylus head at a distal end thereof, the spindle being capable of advancing and retreating in an axis direction,
   each displacement sensor of the plurality of displacement sensors is configured so as to detect displacement of the spindle and output the displacement as measurement data, and
   each displacement sensor of the plurality of displacement sensors is arranged such that a projection direction of each said respective spindle is oriented toward an interior of the band.

8. The cylindricity measuring device according to claim 5, wherein:
   each displacement sensor of the plurality of displacement sensors includes a spindle having a stylus head at a distal end thereof, the spindle being capable of advancing and retreating in an axis direction,
   each displacement sensor of the plurality of displacement sensors is configured so as to detect displacement of the spindle and output the displacement as measurement data, and
   each displacement sensor of the plurality of displacement sensors is arranged such that a projection direction of each said respective spindle is oriented toward an interior of the band.

9. The cylindricity measuring device according to claim 5, wherein the plurality of displacement sensors stacked on top of each other in a vertical direction are configured to measure a cylindricity of a work piece.

10. A roundness measuring method using a roundness measuring device having an annular ring, and a plurality of displacement sensors provided on the ring at predetermined intervals, wherein the plurality of displacement sensors is arranged such that a respective line along which a measurement axis of each displacement sensor of the plurality of displacement sensors extends, intersects at a single point, the method comprising:
    setting the displacement sensors to zero with a master that is a perfect circle and serves as a reference;
    measuring, by the displacement sensors, a measurable object;
    calculating, as eccentricity, offset between a position of the master during calibration and a position of the measured object during the measurement; and
    subtracting the eccentricity obtained in the eccentricity calculating from measured values of the displacement sensors obtained in the measuring, and calculating offset of the measured object from a perfect circle.

11. The roundness measuring method according to claim 10, wherein the plurality of displacement sensors comprise at least eight displacement sensors.

12. The roundness measuring method according to claim 11, wherein:
    each displacement sensor of the plurality of displacement sensors includes a spindle having a stylus head at a distal end thereof, the spindle being capable of advancing and retreating in an axis direction, each displacement sensor of the plurality of displacement sensors is configured so as to detect displacement of the spindle and output the displacement as measurement data, and each displacement sensor of the plurality of displacement sensors is arranged such that a projection direction of each said respective spindle is oriented toward an interior of the ring.

13. The roundness measuring method according to claim 10, wherein:

each displacement sensor of the plurality of displacement sensors includes a spindle having a stylus head at a distal end thereof, the spindle being capable of advancing and retreating in an axis direction, each displacement sensor of the plurality of displacement sensors is configured so as to detect displacement of the spindle and output the displacement as measurement data, and each displacement sensor of the plurality of displacement sensors is arranged such that a projection direction of each said respective spindle is oriented toward an interior of the ring.

14. The roundness measuring method according to claim 10, wherein in the eccentricity calculation, when the eccentricity is split into an X axis component and a Y axis component and expressed by ($\Delta$Cx, $\Delta$Cy), the eccentricity ($\Delta$Cx, $\Delta$Cy) is found by $$\Delta Cx = 2 \times (\Sigma_{i=1}^{i=n} \{di \cdot \cos \theta i\})/n$$

$$\Delta Cy = 2 \times (\Sigma_{i=1}^{i=n} \{di \cdot \sin \theta i\})/n$$

wherein:

di is a measured value for each displacement sensor of the plurality of displacement sensors;

the X axis is a reference line; and an angle formed by the X axis and the measurement axis of each displacement sensor of the plurality of displacement sensors is represented by $\theta i$.

* * * * *